Patented June 6, 1950

2,510,726

UNITED STATES PATENT OFFICE 2,510,726

1-(4-SULFAMYLPHENYL)-3,5-DIMETHYL-4-NITROSOPYRAZOLE AND GERMICIDAL COMPOSITIONS CONTAINING IT

Norman K. Sundholm, Naugatuck, Conn., assignor to United States Rubber Company, New York, N. Y., a corporation of New Jersey No Drawing. Application February 14, 1948, Serial No. 8,310

7 Claims. (Cl. 167—33)

This invention relates to a new chemical which is particularly useful as a germicide, that is, fungicide and bactericide. The invention further relates to a method of treating plants, and to methods of protecting organic material subject to attack by microorganisms, as the immunizing of seed.

The new chemical of the present invention is 1-(4-sulfamylphenyl)-3,5-dimethyl-4-nitrosopyrazole, the structure of which may be represented as follows:

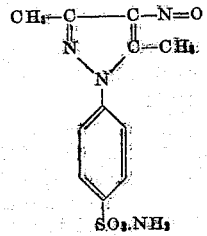

The chemical of the invention may be prepared by the reaction of isonitrosoacetylacetone with p-hydrazinobenzenesulfonamide. The isonitrosoacetylacetone may readily be prepared in known manner by treating acetylacetone with nitrous acid.

The 1-(4-sulfamylphenyl)-3,5-dimethyl-4-nitrosopyrazole may be used to protect and disinfect seeds, to protect plants (which term includes plant parts), and to disinfect soil of microorganisms harmful to seeds and plants. It may also be applied to prevent or retard fungus growth and the formation of mildew on organic material, such as wood, fur, rope, hair, feathers, cotton, wool, synthetic organic fibers, and the like. It may be applied as a dust, as in admixture with powdered solid carriers, such as the various mineral silicates, e. g. mica, talc, pyrophyllite, and clays, or it may be applied as a liquid or spray in a liquid carrier, as in solution in a suitable solvent, or suspended in a suitable non-solvent, for example, water. Preferably when applied in aqueous suspension, the composition contains a dispersing agent for the chemical. In seed treatment, the 1-(4-sulfamylphenyl)-3,5-dimethyl-4-nitrosopyrazole is preferably applied to the seed by tumbling with the chemical alone or admixed with a powdered solid carrier. In foliage treatment, the 1-(4-sulfamylphenyl)-3,5-dimethyl-4-nitrosopyrazole is preferably applied to the plant parts by spraying with an aqueous suspension of the chemical containing a dispersing agent. The chemical may be applied to foliage by the aerosol method. Solutions for the aerosol treatment may be prepared by dissolving the chemical directly in the aerosol carrier which is a liquid under pressure but which is a gas at ordinary temperature (e. g. 20° C.) and atmospheric pressure, or the aerosol solution may be prepared by first dissolving the chemical in a less volatile solvent and then admixing such solution with the highly volatile liquid aerosol carrier. The 1-(4-sulfamylphenyl)-3,5-dimethyl-4-nitrosopyrazole may be used admixed with carriers that are active of themselves, for example, other fungicides, bactericides, insecticides, insectifuges, fertilizers, or hormones.

A detailed preparation of 1-(4-sulfamylphenyl)-3,5-dimethyl-4-nitrosopyrazole is as follows:

A solution of 4.9 g. of sodium nitrite in 20 cc. of water was added dropwise to a stirred suspension of 7 g. of acetylacetone in a mixture of 6 cc. of concentrated hydrochloric acid and 70 cc. of water kept below 10° C. After completion of the addition, the mixture was stirred for one-half hour. The resulting solution of the isonitrosoacetylacetone was added from a dropping funnel to a stirred solution of 13 g. of p-hydrazinobenzenesulfonamide (M. P. 153° C.) in a mixture of 10 cc. of concentrated hydrochloric acid and 300 cc. of water cooled to 10° C. A green solid product slowly separated. After completion of the addition, the mixture was stirred for three hours. The product was separated by filtration and washed with water. It was recrystallized from alcohol to give 9.4 g. of green crystals having a melting point of 198° C. (uncorrected) with decomposition. Analysis. Calculated for $C_{11}H_{12}O_3N_4S$:

C, 47.14; H, 4.28; S, 11.4. Found: C, 46.88; H, 4.11; S, 11.7.

The following examples of the effectiveness of the chemical of the invention as a fungicide and bactericide are given to illustrate the invention (all percentages and parts are by weight):

Example I

An aqueous suspension of 405 parts per million of the 1-(4-sulfamylphenyl)-3,5-dimethyl-4-nitrosopyrazole prepared as above, was sprayed on various tomato plants. The suspension was prepared with a small amount of a commercial dispersing agent which is believed to be a reaction product of ethylene oxide and ricinoleic acid, and which was known to be non-toxic to the organism under test. When the thus treated plants were sufficiently dry, the plants, together with untreated (check) plants, were uniformly inoculated by spraying onto the foliage an aqueous suspension of spores of *Alternaria solani*, the fungus responsible for a series leaf blight disease of this crop. The plants were placed in an inoculation chamber at 75° F. and 99% humidity for twenty hours, after which they were removed to normal greenhouse conditions. After two days in the greenhouse, the effectiveness of the 1-(4-sulfamylphenyl)-3,5-dimethyl-4-nitrosopyrazole was determined by counting the blight lesions on the tomato plants treated with the 1-(4-sulfamylphenyl)-3,5-dimethyl-4-nitrosopyrazole and comparing with the number of blight lesions on the check plants which were not treated with the chemical. The number of blight lesions on the plants treated with the 1-(4-sulfamylphenyl)-3,5-dimethyl-4-nitrosopyrazole averaged 5 per plant, whereas the blight lesions on the check plants averaged 252 per plant, thus showing a control of the fungus with the chemical of 98%.

*Example II*

Pea seed of variety Thomas Laxton were tumbled in jars with different weight percents of 1-(4-sulfamylphenyl)-3,5-dimethyl-4-nitrosopyrazole in finely ground form. The thus treated seeds and also untreated (check) seeds were sown in flats containing soil naturally infested with soil fungi. The flats were placed in a soil cabinet and kept at 58° F. and 99% humidity. After seven days, the flats were removed to the greenhouse bench. When the plants were about 1 inch high, they were scored for emergence. From 200 seeds not treated with the chemical, 64 plants emerged, showing 32.0% germination. From 200 seeds treated with 0.125% of 1-(4-sulfamylphenyl)-3,5-dimethyl-4-nitrosopyrazole, 171 plants emerged, showing 85.5% germination. From 200 seeds treated with 0.063% of 1-(4-sulfamylphenyl)-3,5-dimethyl-4-nitrosopyrazole, 174 plants emerged, showing 87.0% germination. From 200 seeds treated with 0.031% of 1-(4-sulfamylphenyl)-3,5-dimethyl-4-nitrosopyrazole, 141 plants emerged, showing 70.5% germination.

*Example III*

1-(4-sulfamylphenyl)-3,5-dimethyl-4-nitrosopyrazole has been shown to be a bactericide by its ability to inhibit the reproduction of *Bacillus subtilis*, a common soil bacterium, and *Phytomonas tumefaciens*, the casual agent of crown gall disease of apples, roses, and many other plants.

An actively growing culture of bacteria in nutrient-dextrose broth was suspended in warm nutrient-dextrose agar immediately before pouring about 20 cc. in each of several petri dishes 9 cm. in diameter. Sterile filter paper discs, 13 mm. in diameter, were dipped in aqueous suspensions of 1-(4-sulfamylphenyl)-3,5-dimethyl-4-nitrosopyrazole containing 1000, 100 and 10 parts per million (P. P. M.) of the chemical and small amounts of a commercial dispersing agent which is believed to be a reaction product of ethylene oxide and ricinoleic acid, and which was known to be non-toxic to the organisms under test. The discs impregnated with the chemical were transferred to the center of the petri dishes immediately after the agar hardened. The dishes were incubated for fifty hours at 72° F. The diameter of the clear zone which is the zone of inhibition was measured for each test dish. Data on the average diameter of the clear zones for the discs treated with 1-(4-sulfamylphenyl)-3,5-dimethyl-4-nitrosopyrazole, and for the check discs, which were treated with a solution of the dispersing agent in the absence of 1-(4-sulfamylphenyl)-3,5-dimethyl-4-nitrosopyrazole, are shown in the table below:

| Concentration of 1-(4-sulfamylphenyl)-3,5-dimethyl-4-nitrosopyrazole (P. P. M.) | Diameter of Clear Zone against: | |
|---|---|---|
| | B. subtilis | P. tumefaciens |
| | Mm. | Mm. |
| 1000 | 37 | 44 |
| 100 | 35 | 34 |
| 10 | 27 | 21 |
| 0 (check) | 0 | 0 |

This application is a continuation-in-part of application Serial No. 728,192, filed February 12, 1947.

Having thus described my invention, what I claim and desire to protect by Letters Patent is:

1. As a new compound, 1-(4-sulfamylphenyl)-3,5-dimethyl-4-nitrosopyrazole.

2. A germicidal composition comprising 1-(4-sulfamylphenyl)-3,5-dimethyl-4-nitrosopyrazole and a carrier therefor.

3. A germicidal composition comprising an aqueous suspension of 1-(4-sulfamylphenyl)-3,5-dimethyl-4-nitrosopyrazole, said aqueous suspension containing a dispersing agent.

4. A germicidal composition comprising 1-(4-sulfamylphenyl)-3,5-dimethyl-4-nitrosopyrazole and a powdered solid carrier therefor.

5. A germicidal composition comprising 1-(4-sulfamylphenyl)-3,5-dimethyl-4-nitrosopyrazole admixed with a mineral silicate.

6. A germicidal composition comprising 1-(4-sulfamylphenyl)-3,5-dimethyl-4-nitrosopyrazole admixed with clay.

7. A germicidal composition comprising 1-(4-sulfamylphenyl)-3,5-dimethyl-4-nitrosopyrazole admixed with talc.

NORMAN K. SUNDHOLM.

REFERENCES CITED

The following references are of record in the file of this patent:

UNITED STATES PATENTS

| Number | Name | Date |
|---|---|---|
| 1,534,512 | Fritzsche | Apr. 21, 1925 |

OTHER REFERENCES

Sachs et al., Chemical Abstracts, vol. 1, pages 1288–1290.